UNITED STATES PATENT OFFICE.

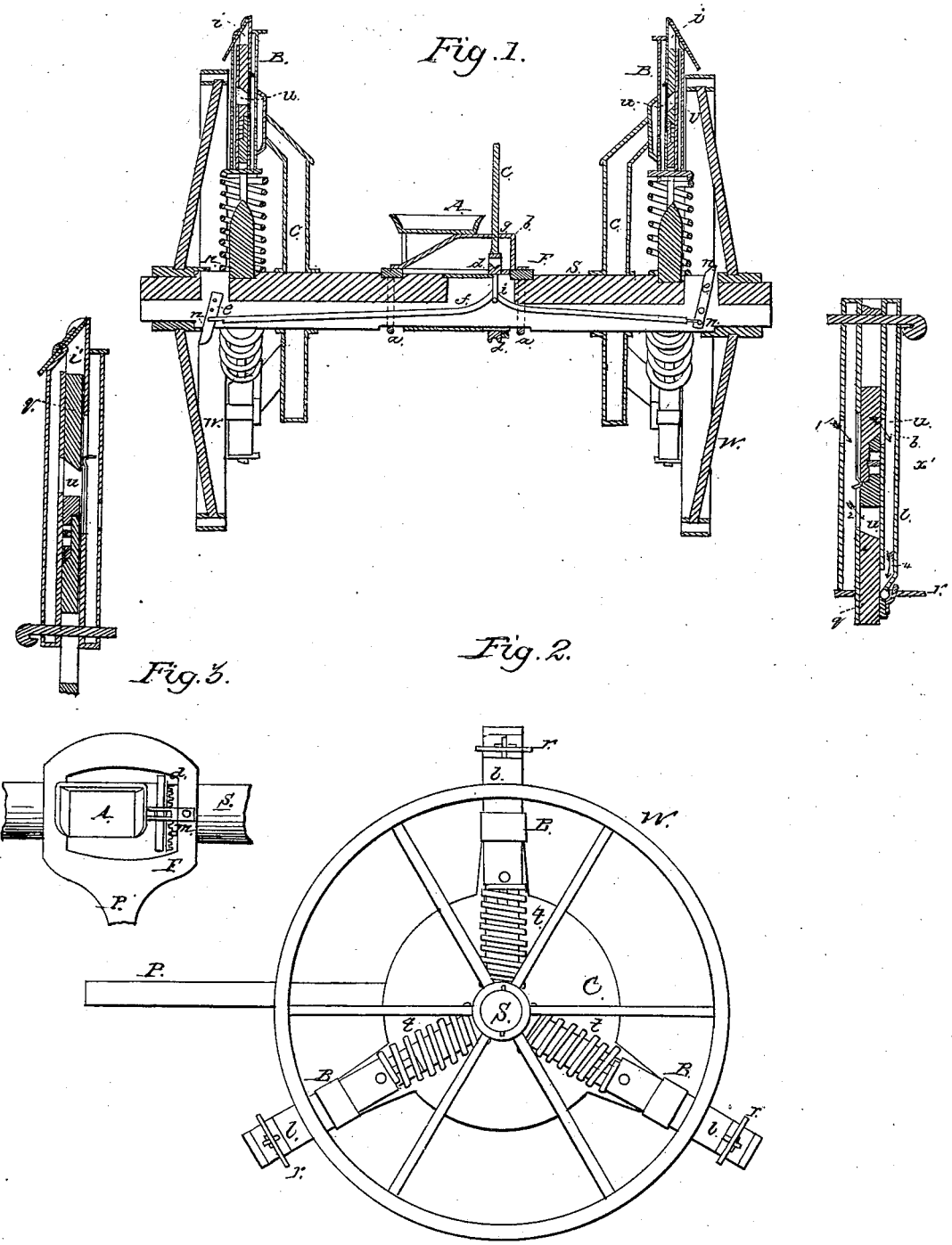

SAMUEL M. PERKINS, OF FORT HILL, ILLINOIS.

IMPROVEMENT IN CORN-PLANTERS.

Specification forming part of Letters Patent No. 16,551, dated February 3, 1857.

*To all whom it may concern:*

Be it known that I, SAMUEL M. PERKINS, of Fort Hill, in the county of Lake and State of Illinois, have invented a new and useful Improvement in Corn-Planters; and I do hereby declare that the following is a full, clear, and exact description of the construction and operation of the same, reference being had to the annexed drawings, forming part of this specification, in which—

Figure 1 is a vertical section of the planter, taken through axis of shaft, the droppers being in position shown in Fig. 2. Fig. 2 is a side elevation of the planter. Fig. 3 is a top view of seat and attachment of draft-pole to shaft.

Similar characters of reference in the several figures denote the same part.

The nature of my invention consists in arranging upon a horizontal shaft mounted upon loose wheels seed-chambers communicating with radial planting apparatus, the wheels capable of connection with the shaft, and the draft attachment being such that it will be fixed to the shaft when the wheels are loose, and vice versa, the operation being as will be hereinafter set forth.

In the drawings, S is the shaft, and W W the wheels turning loosely thereon. The draft-pole P is secured to a frame, F, resting upon the shaft S, and connected therewith by two straps, $a$, extending around the shaft from the under portion of said frame, leaving the shaft free to turn. Upon this frame is the driver's seat A.

Swinging from the cross-piece $b$ is a lever, $c$, whose lower arm is attached to the ring $d$ upon the shaft. The rod $f$ is connected with the two swinging catches $e\ e'$, as shown in Fig. 1, and is also connected with the ring $d$ by a rod or arm, $i$, passing down through a slot in the shaft. The ring $d$ is notched on one edge, as shown in Fig. 3, and when moved by lever $c$ toward the nearest side of frame F will catch a projecting pin, $m$, on said frame, and attach the said frame to the shaft. The inner edges of the hubs of the wheels are notched in a manner similar to that shown on the ring $d$ in Fig. 3, the projecting of these notches being shown at $n$ in Fig. 1. The action of the lever $c$, whose fulcrum is at $g$, is to cause the catches $e\ e'$ to enter notches $n\ n$ and fix the wheels to the shaft at the same time that the ring $d$ is withdrawn from the pin $m$, and the frame F thus released. The connection of pin $m$ and ring $d$ disconnects the wheels W from the shaft S.

Secured upon the shaft S are the seed-chambers C, each communicating with the radial depositing apparatus B, each dropper depositing the requisite number of grains in the hill by the rising of the casing $l$ over the plunger $q$, as shown at X', the flange $r$ rising as far as the rim of the wheel W. On the lifting of the dropper from the ground spring $t$ forces out casing $l$ to the position of Figs. 1 and 2.

There are as many radial droppers as with the diameter of wheel W will give the requisite distance of planting.

The operation of the planter is as follows: While passing to the field the frame F is connected with the shaft S by notched ring $d$ and pin $m$, the droppers having the position shown in Fig. 2, and the wheels left free to revolve. When commencing to plant the wheels W are connected with the shaft, as shown in Fig. 1, the frame F being left free, so that the shaft may rotate beneath it. The seed passes from the main chamber C, as shown by arrow 1 in X', and thence into the cell $u$ of the plunger, whence it is delivered through openings $w$, as shown by arrow 3, when the casing moves outward, and proceeds to the space $i'$, beneath the plunger, to be delivered on the next rising of the casing $l$, which casing, as the machine moves forward, is made to rise by the weight of the machine at the desired point of deposit of the seed in the earth, and after the deposit of the seed is forced down by the pressure of the spring $t$, the action of the construction being, as the wheels revolve, to cause the deposit of the grain in the hill by the means above stated.

With this machine the hills may be aligned in both directions, if proper care be taken by the driver during the operation.

What I claim as new and of my own invention is—

The seed-chambers upon the shaft with radial depositing apparatus, in combination with the wheels and the mechanism by which said wheels are adjusted relative to the shaft, arranged and operating as set forth.

In testimony whereof I have hereunto signed my name before two subscribing witnesses.

SAMUEL M. PERKINS.

Witnesses:
LEOND. SMITH,
OREN MARBLE.